(12) United States Patent
Brown et al.

(10) Patent No.: US 10,834,301 B2
(45) Date of Patent: Nov. 10, 2020

(54) INSULATION OF SMA ACTUATOR WIRES IN A MINIATURE CAMERA

(71) Applicants: CAMBRIDGE MECHATRONICS LIMITED, Cambridge (GB); HUTCHINSON TECHNOLOGY INCORPORATED, Hutchinson, MN (US)

(72) Inventors: Andrew Benjamin David Brown, Cambridge (GB); Peter Francis Ladwig, Hutchinson, MN (US); Richard Rodger Jenneke, Hutchinson, MN (US); Timothy Alan McDaniel, Hutchinson, MN (US); Paul Valentine Pesavento, Hutchinson, MN (US); Todd Austin Peter, Hutchinson, MN (US); Bryan John Scheele, Hutchinson, MN (US)

(73) Assignees: CAMBRIDGE MECHATRONICS LIMITED, Cambridgeshire (GB); HUTCHINSON TECHNOLOGY INCORPORATED, Hutchinson, MN (US)

(*) Notice: Subject to any disclaimer, the term of this patent is extended or adjusted under 35 U.S.C. 154(b) by 0 days.

(21) Appl. No.: 15/021,124

(22) PCT Filed: Sep. 11, 2014

(86) PCT No.: PCT/GB2014/052754
§ 371 (c)(1),
(2) Date: Mar. 10, 2016

(87) PCT Pub. No.: WO2015/036761
PCT Pub. Date: Mar. 19, 2015

(65) Prior Publication Data
US 2016/0227088 A1 Aug. 4, 2016

(30) Foreign Application Priority Data

Sep. 12, 2013 (GB) .................................. 1316235.9
Sep. 12, 2013 (GB) .................................. 1316252.4
Nov. 12, 2013 (GB) .................................. 1319906.2

(51) Int. Cl.
*H04N 5/225* (2006.01)
*G03B 3/10* (2006.01)
(Continued)

(52) U.S. Cl.
CPC .......... *H04N 5/2257* (2013.01); *F03G 7/065* (2013.01); *G02B 7/09* (2013.01); *G02B 27/646* (2013.01);
(Continued)

(58) Field of Classification Search
CPC .. H04N 5/2257; H04N 5/2253; H04N 5/2254; G03B 2205/0007
See application file for complete search history.

(56) References Cited

U.S. PATENT DOCUMENTS 4,985,313 A 1/1991 Penneck et al.
6,509,094 B1 1/2003 Shah et al.
(Continued)

FOREIGN PATENT DOCUMENTS

GB        1195966 A     6/1970
WO   WO-2007-113478 A1  10/2007
(Continued)

OTHER PUBLICATIONS

T. Luchetti et al. "Electrically Actuated Antiglare Rear-View Mirror Based on a Shape Memory Alloy Actuator." Journal of Materials Engineering and Performance. vol. 18, Issue 5-6. Dated Jun. 26, 2009. pp. 717-724.
(Continued)

*Primary Examiner* — James M Hannett

(74) *Attorney, Agent, or Firm* — Harness, Dickey & Pierce, P.L.C.

(57) ABSTRACT

A miniature camera (1) comprising at least one SMA actuator wire (11) arranged to effect focus, zoom or optical image stabilization. The SMA actuator wire (11) is coated with an electrically insulating layer (40) of thickness in the range from 0.3 μm to 10 μm. The layer (40) provides electrical insulation whilst permitting cooling that provides a rapid response time of the SMA actuator wire (11).

14 Claims, 2 Drawing Sheets

(51) Int. Cl.

| | |
|---|---|
| *F03G 7/06* | (2006.01) |
| *G03B 5/00* | (2006.01) |
| *G02B 7/09* | (2006.01) |
| *G02B 27/64* | (2006.01) |
| *H04N 5/232* | (2006.01) |

(52) U.S. Cl.
CPC ............... *G03B 3/10* (2013.01); *G03B 5/00* (2013.01); *H04N 5/2253* (2013.01); *H04N 5/2254* (2013.01); *H04N 5/23212* (2013.01); *H04N 5/23287* (2013.01); *G03B 2205/0007* (2013.01); *G03B 2205/0046* (2013.01); *G03B 2205/0076* (2013.01)

(56) References Cited

U.S. PATENT DOCUMENTS

| | | | |
|---|---|---|---|
| 6,835,083 | B1 | 12/2004 | Alacqua et al. |
| 7,769,487 | B2 | 8/2010 | Ayers et al. |
| 2002/0007958 | A1* | 1/2002 | Rivelli ................. H01B 7/041 174/102 R |
| 2009/0302708 | A1* | 12/2009 | Takahashi ............... F03G 7/065 310/306 |
| 2011/0279916 | A1 | 11/2011 | Brown et al. |
| 2012/0017582 | A1 | 1/2012 | Lewis et al. |
| 2012/0174572 | A1 | 7/2012 | Clausi et al. |
| 2012/0234000 | A1 | 9/2012 | Browne et al. |

FOREIGN PATENT DOCUMENTS

| | | | |
|---|---|---|---|
| WO | WO-2008-099156 A2 | 8/2008 | |
| WO | WO-2008/129291 A2 | 10/2008 | |
| WO | WO-2009-056822 A2 | 5/2009 | |
| WO | WO-2010-089529 A1 | 8/2010 | |
| WO | WO-2011-104518 A1 | 9/2011 | |
| WO | WO 2011104518 A1 * | 9/2011 | ............... G02B 7/08 |
| WO | WO-2013-175197 A1 | 11/2013 | |

OTHER PUBLICATIONS

Ming H. Wu. "Fabrication of Nitinol Materials and Components." Proceedings of the International Conference on Shape Memory and Superelastic Technologies. Kunming, China. Sep. 2-6, 2001. pp. 285-292.

* cited by examiner

INSULATION OF SMA ACTUATOR WIRES IN A MINIATURE CAMERA

CROSS REFERENCE TO RELATED APPLICATIONS

This application is a U.S. National Phase Application under 35 U.S.C. 371 of International Application No. PCT/GB2014/052754 filed on Sep. 11, 2014 and published in English as WO 2015/036761 A1 on Mar. 19, 2015. This application claims priority to Great Britain Patent Application Nos. 1316235.9, 1316252.4, both filed Sep. 12, 2013 and 1319906.2, filed Nov. 12, 2013. The entire disclosure of each of the above applications is incorporated herein by reference.

The present invention relates to the use of SMA (shape memory alloy) actuator wires to effect focus, zoom or optical image stabilization in a miniature camera.

SMA actuator wires are known for use in miniature cameras to effect focus, zoom or optical image stabilization (OIS), as disclosed for example in WO-2013/175197.

For such miniature applications, it is desirable to make the components as small as possible. This can lead to a possible problem if the SMA actuator wire is located very close to other components in the device, especially metallic components. If the SMA actuator wire comes into contact with a metal surface that is at a different potential to the SMA actuator wire, then a short circuit can occur. This can cause local heating on the surface of the wire that can lead to melting and damage such that the SMA actuator wire is weakened which in turn can lead to reduced performance or in the worst case fractures that lead to breakage. To alleviate this problem, one solution is to maintain relatively high clearances, but this increases the size of the camera.

In the entirely different engineering context of a hydraulic system arranged to provide a supply of pressurized working fluid for the control and operation of sub-sea equipment, US-2012017582 discloses a hydraulic accumulator powered by multiple SMA actuator wires. In certain embodiments, the SMA wire may be coated or wrapped with an insulating material selected to provide electrical insulation and thermal insulation sufficient for the SMA materials used for the SMA wires.

However, it might be expected that the provision of an electrically insulating layer providing thermal insulation would be detrimental to the use in a miniature camera on the basis that it would reduce the rate of cooling of the SMA actuator wire and hence the speed of extension of the SMA wire which is important in a miniature camera to provide a rapid response. For example, in an OIS application, rapid heating and cooling of the wire is necessary to compensate for handshake, which typically occurs at frequencies up to several Hertz. A rapid response is also needed in focus and zoom applications. For this reason, there is used thin SMA actuator wire, typically having a diameter of the order of 25 μm, since thin wire heats and cools very quickly. It might be expected that adding an electrically insulating layer to the wire would be inconsistent with this need, since the thermal insulation provides a thermal resistance, and the electrically insulating layer effectively increases the diameter of the wire, reducing the surface to volume ratio.

According to the present invention, there is provided a miniature camera comprising at least one SMA actuator wire arranged to effect focus, zoom or optical image stabilization of the miniature camera, wherein the SMA actuator wire is coated with an electrically insulating layer of thickness in the range from 0.3 μm to 10 μm.

The electrically insulating layer provides the advantage of electrically insulating the SMA actuator wire, and thus reducing the risk of a short circuit that can cause damage to the SMA actuator wires. This may in turn allow the SMA actuator wire to be arranged with smaller clearances that may reduce the overall size of the miniature camera.

In addition, it has been appreciated that the provision of the electrically insulating layer with thickness in the range from 0.3 μm to 10 μm does not in fact reduce the rate of cooling of the SMA actuator wire, as might be expected, and may even increase the rate of cooling.

In addition, contrary to the expectation that the provision of an electrically insulating layer would reduce the rate of cooling of the SMA actuator wire and hence the speed of extension of the SMA wire, detrimental to the use in a miniature camera, it has been found that the use of an electrically insulating layer with a thickness in the range from 0.3 μm to 10 μm, does not significantly decrease the rate of cooling and may even increase it. This is due to the surprising effect that for a thickness in the range from 0.3 μm to 10 μm, the increase in surface area provides the effect of increasing the loss of heat to the surrounding air, which effect compensates for the increase in thermal mass and the increase in thermal resistance arising from the electrically insulating layer, to the extent that the electrically insulating layer does not in fact provide thermal insulation that would prevent the high response times needed in a miniature camera.

To allow better understanding, an embodiment of the present invention will now be described by way of non-limitative example with reference to the accompanying drawings, in which.

Figure 1:
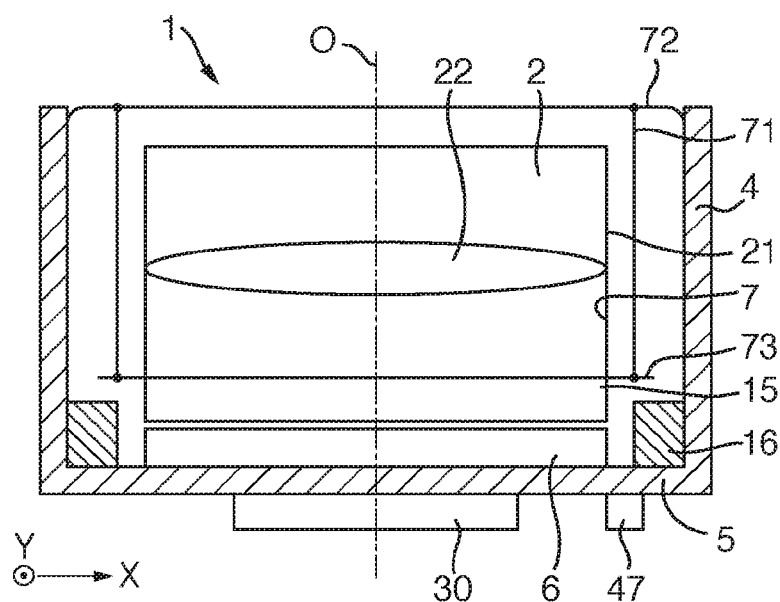
FIG. 1 is a schematic cross-sectional view of a miniature camera.

A miniature camera 1 is shown in FIG. 1 which is a cross-sectional view taken along the optical axis O. In the miniature camera 1, SMA actuator wires are arranged to effect optical image stabilization, but in order to clearly describe the main parts of the miniature camera 1, the SMA actuator wires are not shown in FIG. 1, but subsequently described with reference to FIG. 2. The miniature camera 1 is to be incorporated in a portable electronic device such as a mobile telephone, media player or portable digital assistant. Thus miniaturisation is an important design criterion.

Except as regards the provision of an electrically insulating layer, the miniature camera 1 has the constructions described in WO-2013/175197, which is incorporated herein by reference. For brevity, a concise description of the miniature camera is provided herein, but reference is made to WO-2013/175197 for further details.

The miniature camera 1 comprises a lens element 2 supported on a support structure 4 by a suspension system 7 that comprises four beams 71 connected between a support plate 72 that forms part of the support structure 4 and a lens plate 73 that forms part of the lens element 2 and is connected to the rear end of the lens carrier 21 as shown in FIG. 1. The suspension system 7 supports the lens element 2 in a manner allowing movement of the lens element 2 relative to the support structure 4 in two orthogonal directions each perpendicular to the optical axis O.

The support structure 4 is a camera support supporting an image sensor 6 on the front side of the base 5 thereof. On the rear side of the base 5 there is mounted an IC (integrated circuit) chip 30 in which a control circuit is implemented, and also a gyroscope sensor 47.

The lens element 2 comprises a lens carrier 21 in the form of a cylindrical body supporting a lens 22 arranged along the optical axis O, although in general any number of lenses 22 may be provided. The miniature camera 1 is a miniature camera in which the lens 22 (or lenses 22 if plural lenses are provided) has a diameter of at most 10 mm.

The lens element 2 is arranged to focus an image onto the image sensor 6. The image sensor 6 captures the image and may be of any suitable type, for example a CCD (charge-coupled device) or a CMOS (complimentary metal-oxide-semiconductor) device.

The lens 22 (or lenses 22 if plural lenses are provided) may be fixed relative to the lens carrier 21, or alternatively may be supported on the lens carrier in a manner in which the lens 22 (or at least one lens 22 if plural lenses are provided) is movable along the optical axis O, for example to provide focussing. Where the lens 22 is movable along the optical axis O, a suitable actuation system (not shown) may be provided, for example using a voice coil motor or SMA actuator wires, such as is described in WO-2007/113478.

In operation, the lens element 2 is moved orthogonally to the optical axis O in two orthogonal directions, shown as X and Y relative to the image sensor 6, with the effect that the image on the image sensor 6 is moved. This is used to provide OIS, compensating for image movement of the miniature camera 1, caused by for example hand shake.

Movement of the lens element 2 is driven by an actuator arrangement 10 shown in FIG. 2, as will now be described.

The actuator arrangement 10 comprises a total of four SMA actuator wires 11 connected between a support block 16 that forms part of the support structure 4 and is mounted to the base 5 and a movable platform 15 that forms part of the lens element 2 and is mounted to the rear of the lens plate 73 as shown in FIG. 1. The SMA actuator wires 11 are connected at their ends to the movable platform 15 and the support block 16 by respective crimps 17. The crimps 17 crimp the SMA actuator wires 11 to hold them mechanically, optionally strengthened by the use of adhesive. The crimps 17 also provide an electrical connection to the SMA actuator wires 11.

Each of the SMA actuator wires 11 is held in tension, thereby applying a force between the movable platform 15 and the support block 16 in a direction perpendicular to the optical axis O. In operation, the SMA actuator wires 11 move the lens element 2 relative to the support block 16 in two orthogonal directions perpendicular to the optical axis O.

The SMA actuator wires 11 have an arrangement around the optical axis O as follows. Each of the SMA actuator wires 11 is arranged along one side of the lens element 2. Thus, a first pair of the SMA actuator wires 11 arranged on opposite sides of the optical axis O are capable on selective driving to move the lens element 2 relative to the support structure 4 in a first direction in said plane and a second pair of SMA actuator wires 11 arranged on opposite sides of the optical axis O. are capable on selective driving to move the lens element 2 relative to the support structure 4 in a second direction in said plane transverse to the first direction. Movement in directions other than parallel to the SMA actuator wires 11 may be driven by a combination of actuation of these pairs of the SMA actuator wires 11 to provide a linear combination of movement in the transverse directions.

As a result, the SMA actuator wires 11 are capable of being selectively driven to move the lens element 2 relative to the support structure 4 to any position in a range of movement in two orthogonal directions perpendicular to the optical axis O. The magnitude of the range of movement depends on the geometry and the range of contraction of the SMA actuator wires 11 within their normal operating parameters.

The position of the lens element 2 relative to the support structure 4 perpendicular to the optical axis O is controlled by selectively varying the temperature of the SMA actuator wires 11. This is achieved by passing through SMA actuator wires 11 selective drive currents that provides resistive heating. Heating is provided directly by the drive current. Cooling is provided by reducing or ceasing the drive current to allow the lens element 2 to cool by conduction, convection and radiation to its surroundings. Rapid heating and cooling of the SMA actuator wire 11 is necessary to compensate for handshake, which typically occurs at frequencies up to several Hertz. A rapid response is also needed in focus and zoom applications. For this reason, there is used thin SMA actuator wire 11, typically having a diameter of the order of 25 µm, since such thin wire heats and cools very quickly.

The control of the SMA actuator wires 11 is effected by a control circuit implemented in the IC chip 30 which generates drive signals for each of the SMA actuator wires 11 to effect OIS. The drive signals are generated on the basis of the output signal of the gyroscope sensor 47 that detects the angular velocity of the lens element 2, thereby acting as a vibration sensor that detects the vibrations of the miniature camera 1.

Figure 3:
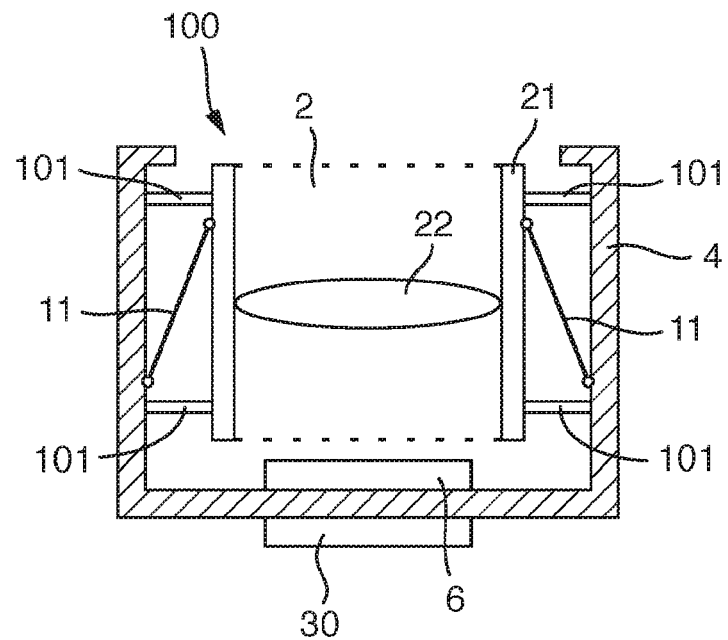
FIG. 3 is a schematic cross-sectional view of a further miniature camera.

Another miniature camera 100 is shown in FIG. 3 which is a cross-sectional view taken along the optical axis O. The miniature camera 100 includes SMA actuator wires 11 arranged to effect focus or zoom of the miniature camera 100. The miniature camera 100 has a generally similar construction to the miniature camera 1 shown in FIG. 1 including: a support structure 4; a lens element 2 comprising a lens carrier 21 supporting a lens 22; an image sensor 6; and an IC chip 30 in which a control circuit for the SMA actuator wires is implemented. However, the lens element 2 is supported on the support structure 4 by flexures 101 which form a suspension system that guides movement of the lens element 2 along the optical axis O to change the focus or zoom of the image formed on the image sensor 6. Except as regards the provision of an electrically insulating layer 40 on the SMA actuator wires 11, the miniature camera 100 may have the construction described in detail in any one of WO-2007/113478, WO-2008/099156 or WO-2009/056822, which are each incorporated herein by reference, and to which reference is made for a full description of the miniature camera 100. In general, the miniature camera 100 may include a single SMA actuator wire 11 or plural SMA actuator wires 11.

Figure 2:
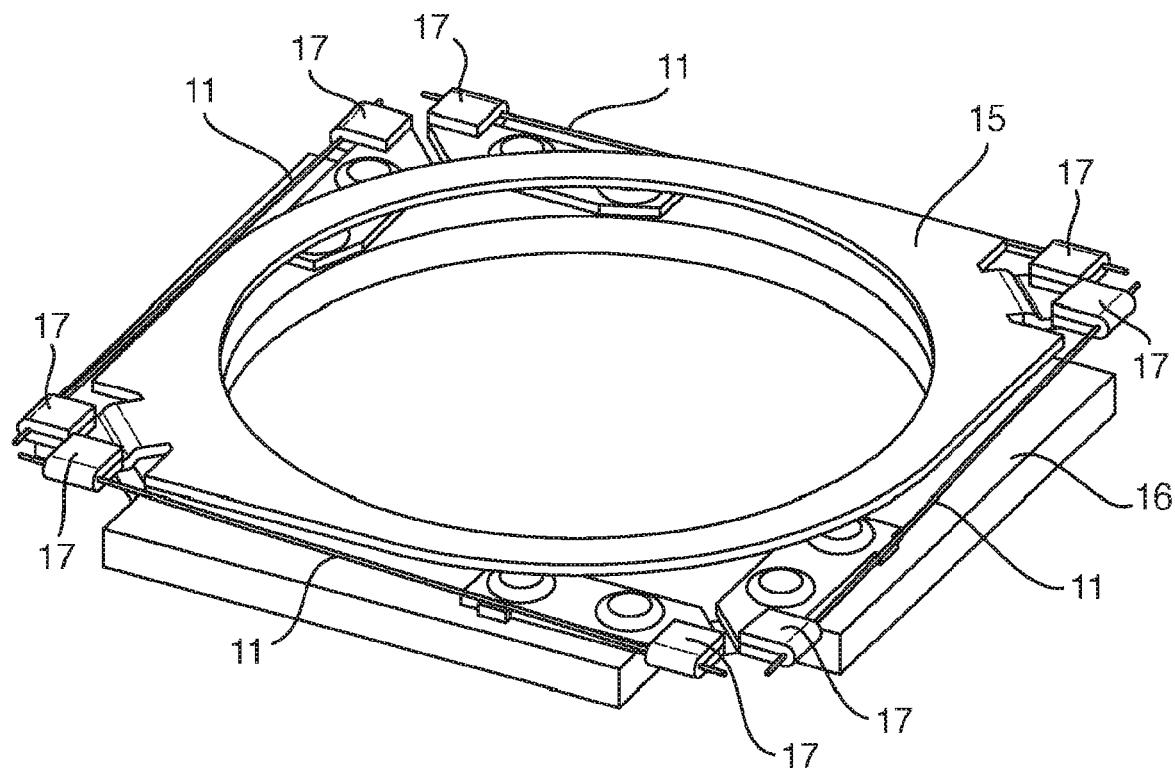
FIG. 2 is a perspective view of the arrangement of SMA actuator wires in the miniature camera.
Figure 4:
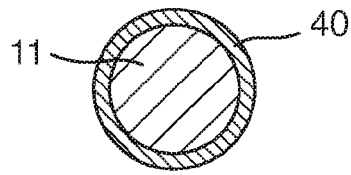
FIG. 4 is a cross-sectional view of an SMA actuator wire.

The or each SMA actuator wire 11 in the miniature camera 1 of FIGS. 1 and 2 and the miniature camera 100 of FIG. 3 is coated with an electrically insulating layer 40 as shown in FIG. 4. The electrically insulating layer 40 has a thickness that is sufficiently high to prevent electrical breakdown between the wire and any metal surface that it might come into contact with. This depends on the insulation capability of the electrically insulating layer 40 and the maximum voltages applied to the SMA actuator wires 11 in normal use.

In general, the insulation capability of the electrically insulating layer 40 depends on the type of material used. In air, the breakdown field strength of suitable materials is typically in the region of 3V/μm. Thus, for example, if the electrically insulating layer 40 extends along part of the length of the SMA actuator wire 11, then a thickness of at least 1 μm might be required to ensure that no breakdown occurs with a 2.8V potential difference. However, if the electrically insulating layer 40 coats the entire length of the SMA actuator wire 11, then a lower thickness might be sufficient to prevent breakdown.

In typical applications, the electrically insulating layer 40 has a thickness of at least 0.3 μm, more preferably at least 0.9 μm.

The electrically insulating layer 40 has a thickness that is sufficiently low to provide a cooling performance that is appropriate to the use in a miniature camera. It might be expected that an electrically insulating layer would reduce the rate of cooling of the SMA actuator wire and hence the speed of extension of the SMA wire, since the thermal insulation provides a thermal resistance, and the electrically insulating layer effectively increases the diameter of the wire, reducing the surface to volume ratio. However, it has been appreciated that an electrically insulating layer 40 with a relatively low thickness increases the surface area so as to provide the effect of increasing the loss of heat to the surrounding air, which effect compensates for the increase in thermal mass and the increase in thermal resistance arising from the electrically insulating layer. Thus, the rate of cooling is not reduced to the extent that might be expected, and depending on the configuration and materials may be increased. Thus, the electrically insulating layer 40 has a relatively low thickness such that it permits the high response times needed in a miniature camera.

In typical applications, the electrically insulating layer 40 has a thickness of at most 10 μm, more preferably at most 5 μm.

The optimal thickness of the electrically insulating layer 40 in general depends on the material used and the distance to surfaces around the SMA actuator wire 11 that act as a thermal ground and/or provide a risk of shorting.

Various materials are suitable for the electrically insulating layer 40, some non-limitative examples of which are as follows.

SMA material typically forms an oxide coating of order of 0.1 μm, which thickness is not sufficient to prevent electrical breakdown at 2V-5V. The thickness of this coating can be increased through thermal and chemical treatments to a suitable level, thereby to form the electrically insulating layer 40.

Alternatively, the electrically insulating layer 40 may be formed by material applied to the SMA actuator wire 11 during manufacture. Such a material may be applied to the SMA actuator wire 11 on top of an oxide layer, or after removal of the oxide layer so that it is applied directly to the SMA material. Suitable materials that may be applied to form the electrically insulating layer 40 include, without limitation: polyimide, polyamide, polyurethane, Parylene, polytetrafluoroethylene (PTFE) or any combination thereof.

In general, the electrically insulating layer 40 may coat the entire length of the SMA actuator wire 11 or a part of the length of the SMA actuator wire 11.

However, a further consideration is the need to achieve good mechanical and electrical contact between the SMA actuator wire 11 and the crimps 17. The electrically insulating layer 40 may hinder this, especially if it is relatively thick (say, of the order of 1 μm or more) as the mechanical action of closing the jaws of the crimp 17 during manufacture is not sufficient to break down the electrically insulating layer 40 and make good contact with the SMA material beneath.

Figure 5:
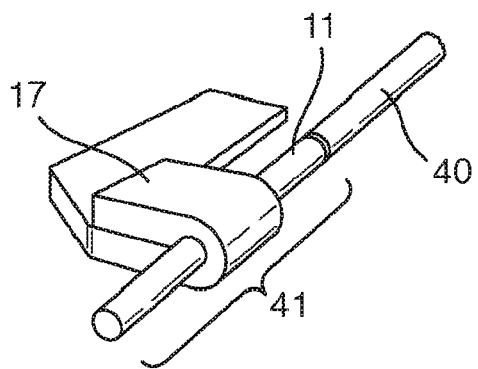
FIG. 5 is a perspective view of an end portion of the SMA actuator wire.

To reduce this issue, the SMA actuator wires may be coated with the electrically insulating layer along part of their length, but not at the crimps 17, as shown in FIG. 5. As can be seen, in this example the length 41 of the part of the SMA actuator wire 11 that is not coated with the electrically insulating layer 40 is greater than the length of contact between the SMA actuator wire 11 and the crimp 17, such that good contact is made within the crimp 17 while providing easy placement of the crimp 17. Leaving a region of the SMA actuator wire 11 outside the crimp 17 uncoated is not an issue, since that region of the SMA actuator wire 11 near the crimp 17 is unlikely to come into shorting contact with any other component. The length of the crimp 17 is typically of the order of 500 μm long, so the uncoated region may typically be up to 1 mm in length.

To achieve partial coating, the electrically insulating layer 40 may be provided along part of the length of the SMA actuator wire 11 during manufacture by selective coating (for example using a mask prior to coating), or by coating the entire length of the SMA actuator wire 11 and subsequently selectively removing part of the electrically insulating layer 40. In the latter case, removal of the electrically insulating layer 40 may be by mechanical abrasion, or other chemical or physical means such as focussed laser or plasma ablation.

Such coating may be performed prior to assembly of the SMA actuator wire 11 into the miniature camera. As an alternative the electrically insulating layer may be formed along part of the length of the SMA actuator wires during manufacture by coating a partial assembly comprising the SMA actuator wires and other components of the miniature camera. That is, the SMA actuator wire 11 is coated after crimping, that is after the electrical connection via the crimp 17 has been made. In this case, the SMA actuator wire 11 may be first crimped and assembled with other components of the miniature camera 1 or 100 and then the partial assembly containing the SMA actuator wire 11 is coated, for example by spraying, dipping or electrophoretic coating. This coats the parts of the SMA actuator wire 11 that are exposed but not the SMA actuator wire 11 beneath the crimp 17. This also coats any other exposed components in the partial assembly, providing the possibility of additional shorting protection.

Another alternative for good mechanical and electrical contact between the SMA actuator wire 11 and the crimps 17 is for the crimp 17 to crimped to the SMA actuator wire 11 after coating by the electrically insulating layer 40 and subsequently to solder the crimp 17 to the SMA actuator wire 11, for example at the joint where the SMA actuator wire 11 emerges from one side of the crimp 11. Whilst crimping does not break through the electrically insulating wire 40, it nevertheless provides a good mechanical joint, and the solder provides the desired electrical connection. Soldering causes the electrically insulating wire 40 to melt locally exposing the bare SMA actuator wire 11 at the solder site and providing an electrical connection there.

The invention claimed is:

1. A miniature camera comprising at least one SMA actuator wire arranged, on application of drive signals that cause resistive heating of the at least one SMA wire, to effect focus, zoom or optical image stabilization of the miniature camera, wherein the at least one SMA actuator wire comprises SMA material coated with an electrically insulating layer of thickness in the range from 0.3 μm to 10 μm, there being no other conductive material inside the electrically insulating layer besides the SMA material.

2. The miniature camera according to claim 1, wherein the thickness of the electrically insulating layer is in the range from 0.9 μm to 5 μm.

3. The miniature camera according to claim 1, wherein the electrically insulating layer is an oxide layer.

4. The miniature camera according to claim 1, wherein the electrically insulating layer comprises polyimide, polyamide, polyurethane, Parylene, polytetrafluoroethylene, or any combination thereof.

5. The miniature camera according to claim 1, wherein the SMA actuator material is coated with the electrically insulating layer along part of its length.

6. The miniature camera according to claim 5, further comprising crimps arranged to provide electrical and mechanical connections between the SMA actuator material and the other components of the miniature camera, and the parts of the wire that are not coated with the electrically insulating layer are at the crimps.

7. The miniature camera according to claim 6, wherein the length of the parts of the SMA actuator material that is not coated with the electrically insulating layer are greater than the lengths of contact between the SMA actuator material and the crimp.

8. The miniature camera according to claim 5, wherein the electrically insulating layer along part of the length of the SMA actuator material is manufactured by selective coating.

9. The miniature camera according to claim 5, wherein the electrically insulating layer along part of the length of the SMA actuator material is manufactured by coating the entire length of the SMA actuator material and subsequently selectively removing part of the electrically insulating layer.

10. The miniature camera according to claim 5, wherein the electrically insulating layer along part of the length of the SMA actuator material is manufactured by coating a partial assembly comprising the SMA actuator wire and other components of the miniature camera.

11. The miniature camera according to claim 1, wherein the miniature camera comprises one or more lenses having a diameter of at most 10 mm.

12. The miniature camera according to claim 1, wherein the at least one SMA actuator wire is arranged to effect optical image stabilization.

13. The miniature camera according to claim 12, further comprising:
   a support structure;
   an image sensor fixed to the support structure;
   a camera lens element comprising one or more lenses arranged to focus an image on the image sensor, the camera lens element being supported on the support structure in a manner allowing movement of the camera lens element relative to the support structure across a range of movement in two orthogonal directions perpendicular to the optical axis of the camera lens element,
   wherein the at least one SMA actuator wire is arranged to drive said movement of the camera lens element relative to the support structure.

14. The miniature camera according to claim 1, further comprising:
   a support structure;
   an image sensor fixed to the support structure;
   a camera lens element comprising one or more lenses arranged to focus an image on the image sensor,
   wherein the at least one SMA actuator wire is arranged to drive said movement of the camera lens element relative to the support structure.

\* \* \* \* \*